United States Patent
Jungwirth (10) Patent No.: US 10,627,477 B2
(45) Date of Patent: Apr. 21, 2020

(54) HIGH SPEED, THREE-DIMENSIONAL LOCATING

(71) Applicant: THE BOEING COMPANY, Chicago, IL (US)

(72) Inventor: Douglas R. Jungwirth, Chicago, IL (US)

(73) Assignee: The Boeing Company, Chicago, IL (US)

( * ) Notice: Subject to any disclaimer, the term of this patent is extended or adjusted under 35 U.S.C. 154(b) by 752 days.

(21) Appl. No.: 15/400,900

(22) Filed: Jan. 6, 2017

(65) Prior Publication Data
US 2018/0196119 A1 Jul. 12, 2018

(51) Int. Cl.
*G01S 5/02* (2010.01)
*G01S 5/16* (2006.01)
*G01S 5/04* (2006.01)
*G01S 5/08* (2006.01)

(52) U.S. Cl.
CPC .............. *G01S 5/0284* (2013.01); *G01S 5/04* (2013.01); *G01S 5/08* (2013.01); *G01S 5/16* (2013.01); *G01S 5/166* (2013.01)

(58) Field of Classification Search
CPC . G01S 5/0284; G01S 5/04; G01S 5/08; G01S 5/16; G01S 5/166; G01S 3/74; G01S 13/765; G01B 11/002; H01Q 3/26
See application file for complete search history.

(56) References Cited

U.S. PATENT DOCUMENTS

| 6,246,369 B1* | 6/2001 | Brown ...................... H01Q 3/26 343/700 MS |
| 7,876,216 B2 | 1/2011 | Coffland et al. |
| 2002/0126043 A1* | 9/2002 | Martinerie ................ G01S 5/04 342/357.48 |

(Continued)

OTHER PUBLICATIONS

R.B. Dybdal, Monopulse Resolution of Interferometric Ambiguities, IEEE Transactions on Aerospace and Electronic Systems, vol. AES-22, p. 177-183, Mar. 1986. (Year: 1986).*

(Continued)

*Primary Examiner* — Bernarr E Gregory
*Assistant Examiner* — Fred H Mull
(74) *Attorney, Agent, or Firm* — Haynes and Boone LLP (57) ABSTRACT

A disclosed method for a locating system comprises transmitting, by at least two transmitters on each of at least one transmitter platform, at least one signal, where each of the signals transmitted from a different transmitter is modulated at a different oscillation frequency, and the distance between the transmitters on each of the transmitter platforms is known. The method further comprises receiving, by a detector(s) on each of a target platform(s), the signal(s). When the detector(s) receives the signal(s), the signal(s) is focused at a location on the detector(s). Also, the method comprises determining an angle the signal(s) is being transmitted to the detector(s) from the transmitters by using the location(s). Further, the method comprises determining a relative position of each of the transmitter platform(s) with respect to the target platform(s) by using the angle(s) and by using the distance between the transmitters on each of the transmitter platform(s).

20 Claims, 7 Drawing Sheets

(56) References Cited

U.S. PATENT DOCUMENTS

| | | | | |
|---|---|---|---|---|
| 2009/0281419 A1* | 11/2009 | Troesken | ............... | G01S 13/765 600/424 |
| 2015/0029486 A1* | 1/2015 | Kang | ........................ | G01S 5/16 356/4.01 |

OTHER PUBLICATIONS

Electronic Warfare and Radar Systems Engineering Handbook, Naval Air Systems Command, p. 10-1.17, Apr. 1999 (Year: 1999).*

T. Ide et al., DOA Estimation with Super Resolution Capabilities Using a Multi-beam Antenna of the Dielectric Lens, International Symposium on Antennas and Propagation (ISAP), 2011 (Year: 2011).*

* cited by examiner

FIG. 8

HIGH SPEED, THREE-DIMENSIONAL LOCATING

FIELD

The present disclosure relates to locating. In particular, it relates to high speed, three-dimensional (3D) locating.

BACKGROUND

Currently, there are various approaches employed to accurately determine the relative position between different platforms (e.g., vehicles, such as airborne vehicles). Conventional approaches include light detection and ranging (LIDAR) systems, laser trackers, pattern recognition techniques, and proximity sensors. However, most of these techniques require large and/or expensive sensors, and complicated digital processing. As such, there is a need for an improved technique to accurately determine the relative position between various platforms.

SUMMARY

The present disclosure relates to methods, systems, and apparatuses for high speed, three-dimensional (3D) locating. In one or more embodiments, a method for a locating system comprises transmitting, by at least two transmitters on each of at least one transmitter platform, at least one signal. In one or more embodiments, a distance between at least two transmitters on each of at least one transmitter platform is known. In at least one embodiment, each of at least one signal transmitted from a different one of at least two transmitters is modulated at a different oscillation frequency. The method further comprises receiving, by at least one detector on each of at least one target platform, at least one signal. In one or more embodiments, when at least one detector receives at least one signal, at least one signal is focused at a location on at least one detector. Also, the method comprises determining, by at least one processor, an angle at least one signal is being transmitted to at least one detector from at least two transmitters by using the location at least one signal is focused on at least one detector. Further, the method comprises determining, by at least one processor, a relative position of each of at least one transmitter platform with respect to at least one target platform by using the angle at least one signal is being transmitted to at least one detector from each of at least two transmitters and by using the distance between at least two transmitters on each of at least one transmitter platform.

In at least one embodiment, each of at least one signal transmitted from a different one of at least two transmitters has a different transmission frequency.

In one or more embodiments, at least one transmitter platform is a vehicle. In some embodiments, the vehicle is a space vehicle, an airborne vehicle, a marine vehicle, or a terrestrial vehicle.

In at least one embodiment, at least one target platform is a vehicle. In some embodiments, the vehicle is a space vehicle, an airborne vehicle, a marine vehicle, or a terrestrial vehicle.

In one or more embodiments, at least one detector is a two-dimensional position sensitive detector (2D-PSD).

In at least one embodiment, at least one signal is an electromagnetic (EM) signal. In some embodiments, the EM signal is a radio frequency (RF) signal, an X-ray signal, a visible light signal, an ultraviolet light signal, an infrared signal, a terahertz signal, or an optical signal.

In one or more embodiments, the determining, by at least one processor, of the angle that at least one signal is being transmitted to at least one detector from at least two transmitters is achieved: (a) by at least one detector generating at least one location signal indicating the location that at least one signal is focused on at least one detector, (b) by transforming, by at least one fourier transform converter, at least one location signal, to generate at least one transformed signal, and (c) by at least one processor using at least one transformed signal to determine the angle that at least one signal is being transmitted to at least one detector from at least two transmitters.

In at least one embodiment, a locating system comprises at least two transmitters on each of at least one transmitter platform to transmit at least one signal. In one or more embodiments, a distance between at least two transmitters on each of at least one transmitter platform is known. In at least one embodiment, each of at least one signal transmitted from a different one of at least two transmitters is modulated at a different oscillation frequency. The system further comprises at least one detector on each of at least one target platform to receive at least one signal. In one or more embodiments, when at least one detector receives at least one signal, at least one signal is focused at a location on at least one detector. Also, the system comprises at least one processor to determine an angle at least one signal is being transmitted to at least one detector from at least two transmitters by using the location at least one signal is focused on at least one detector, and to determine a relative position of each of at least one transmitter platform with respect to at least one target platform by using the angle at least one signal is being transmitted to at least one detector from each of at least two transmitters and by using the distance between at least two transmitters on each of at least one transmitter platform.

In one or more embodiments, at least one processor determines the angle that at least one signal is being transmitted to at least one detector from at least two transmitters: (a) by at least one detector generating at least one location signal indicating the location that at least one signal is focused on at least one detector, (b) by at least one fourier transform converter transforming at least one location signal to generate at least one transformed signal, and (c) by at least one processor using at least one transformed signal to determine the angle that at least one signal is being transmitted to at least one detector from at least two transmitters.

In at least one embodiment, a method for a locating system comprises transmitting, by at least one transmitter on each of at least one transmitter platform, at least one signal. In one or more embodiments, when there is more than one of at least one transmitter, each of at least one signal transmitted from a different one of the transmitters is modulated at a different oscillation frequency. The method further comprises receiving, by at least two detectors on each of at least one target platform, at least one signal. In at least one embodiment, a distance between at least two detectors on each of at least one target platform is known. In some embodiments, when at least two detectors receives at least one signal, at least one signal is focused at a location on each of at least two detectors. Also, the method comprises determining, by at least one processor, an angle at least one signal is being transmitted to each of at least two detectors from at least one transmitter by using the location at least one signal is focused on each of at least two detectors. Further, the method comprises determining, by at least one processor, a relative position of at least one transmitter platform with respect to at least one target platform by using the angle at least one signal is being transmitted to each of at least two detectors from at least one transmitter and by using the distance between at least two detectors on each of at least one target platform.

In one or more embodiments, the determining, by at least one processor, of the angle that at least one signal is being transmitted to each of at least two detectors from at least one transmitter is achieved: (a) by each of at least two detectors generating at least one location signal indicating the location that at least one signal is focused on each of at least two detectors, (b) by transforming, by at least one fourier transform converter, at least one location signal, to generate at least one transformed signal, and (c) by at least one processor using at least one transformed signal to determine the angle that at least one signal is being transmitted to each of at least two detectors from at least one transmitter.

In at least one embodiment, a locating system comprises at least one transmitter on each of at least one transmitter platform to transmit at least one signal. In one or more embodiments, when there is more than one of at least one transmitter, each of at least one signal transmitted from a different one of the transmitters is modulated at a different oscillation frequency. The system further comprises at least two detectors on each of at least one target platform to receive at least one signal. In at least one embodiment, a distance between at least two detectors on each of at least one target platform is known. In one or more embodiments, when at least two detectors receives at least one signal, at least one signal is focused at a location on each of at least two detectors. Further, the system comprises at least one processor to determine an angle at least one signal is being transmitted to each of at least two detectors from at least one transmitter by using the location at least one signal is focused on each of at least two detectors, and to determine a relative position of at least one transmitter platform with respect to at least one target platform by using the angle at least one signal is being transmitted to each of at least two detectors from at least one transmitter and by using the distance between at least two detectors on each of at least one target platform.

In one or more embodiments, at least one processor determines the angle that at least one signal is being transmitted to each of at least two detectors from at least one transmitter: (a) by each of at least two detectors generating at least one location signal indicating the location that at least one signal is focused on each of at least two detectors, (b) by at least one fourier transform converter transforming at least one location signal to generate at least one transformed signal, and (c) by at least one processor using at least one transformed signal to determine the angle that at least one signal is being transmitted to each of at least two detectors from at least one transmitter.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for high speed, three-dimensional (3D) locating. The system of the present disclosure provides a technique to monitor the relative position of one or more platforms (e.g., vehicles, such as airborne vehicles) by using transmitters, which are on transmitter platforms, transmitting signals with different frequency modulations, and by using detectors (e.g., two-dimensional, position sensitive detectors (2D-PSDs)), which are on target platforms, to receive the signals. Each of the signals produces a focused spot on the detectors that corresponds to the angle that each of the signals is being transmitted to the detectors from the transmitters. The angle of each of the signals is then used to determine (by using simple geometry) a relative position of each of the transmitter platforms with respect to the target platforms.

As previously mentioned above, currently, there are various approaches employed to accurately determine the relative position between different platforms (e.g., vehicles, such as airborne vehicles). Conventional approaches include light detection and ranging (LIDAR) systems, laser trackers, pattern recognition techniques, and proximity sensors. However, most of these techniques require large and/or expensive sensors, and complicated digital processing. The system of the present disclosure provides an improved technique to accurately determine the relative position between various platforms by using only simple equipment, which is small and sturdy, and can be used in various different environments. The disclosed technique is able to accurately determine the relative position between various platforms by employing only simple transmitters, detectors, and data processing approaches.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to locating systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
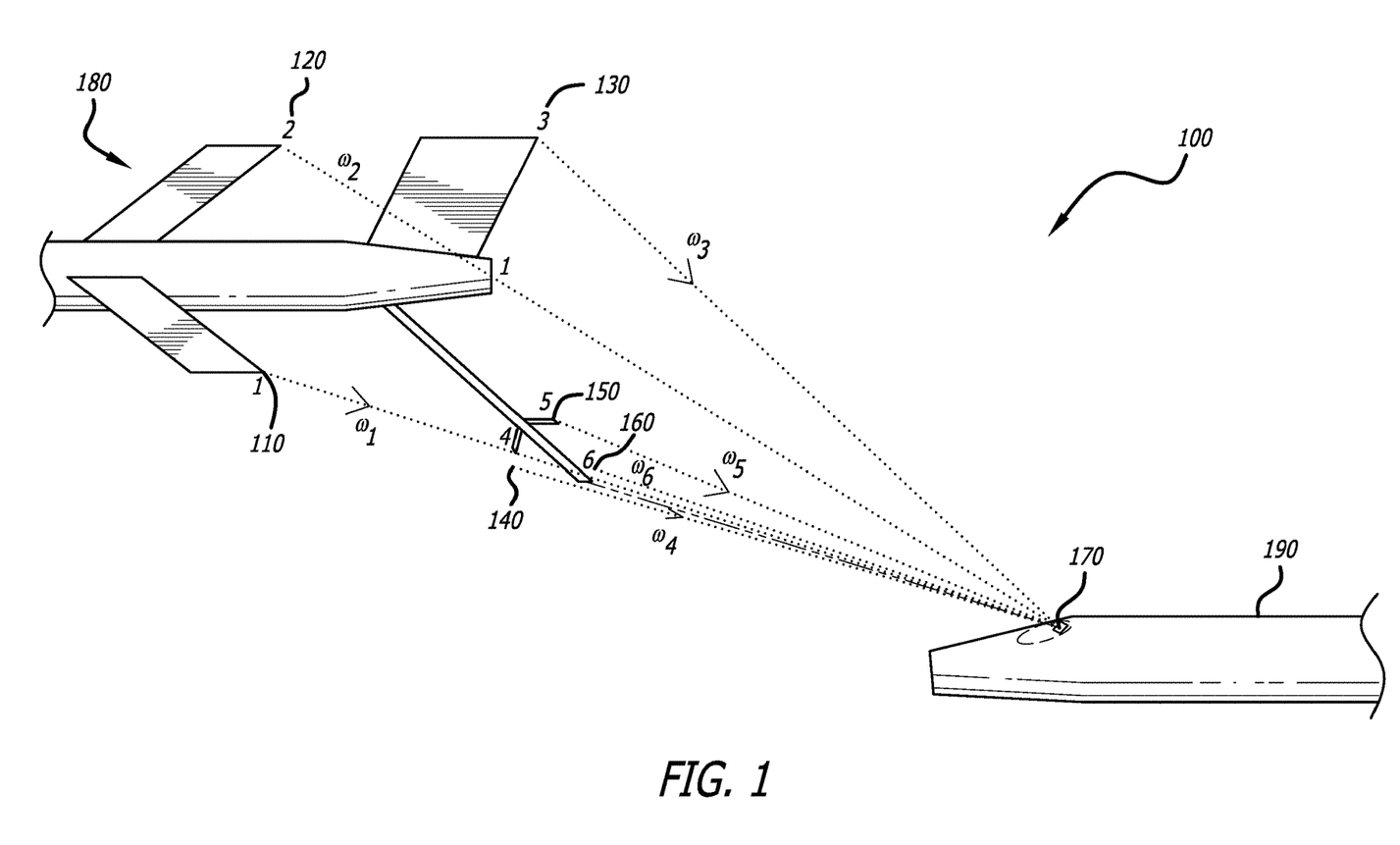
FIG. 1 is a diagram showing the disclosed high speed, three-dimensional (3D) locating system, in accordance with at least one embodiment of the present disclosure.

FIG. 1 is a diagram 100 showing the disclosed high speed, three-dimensional (3D) locating system, in accordance with at least one embodiment of the present disclosure. In this figure, a transmitter platform 180 and a target platform 190 are shown. The transmitter platform 180 and a target platform 190 are depicted as aircraft, where the transmitter platform 180 is attempting to refuel the target platform 190.

It should be noted that in other embodiments, the disclosed system may employ more than one transmitter platform 180 and/or more than one target platform 190, as is shown in FIG. 1. For example, in some embodiments, a mother drone (e.g., a target platform) comprising a detector could be commanding a swarm of baby drones (e.g., transmitter platforms), where each baby drone comprises transmitters.

In addition, it should be noted that in other embodiments, various different types of vehicles may be employed for the transmitter platform 180 and/or the target platform 190 other than aircraft as shown in FIG. 1 including, but not limited to, other airborne vehicles (e.g., refueling unmanned aerial vehicles (UAVs)), space vehicles (e.g., docking maneuvers on satellite vehicles or the space station), marine vehicles (e.g., maneuvering a naval ship in channels or canals), and terrestrial vehicles (e.g., aircraft and spacecraft assembly of large body parts in the factory).

Additionally, it should be noted that any sort of moving mechanical systems that need to connect, align, and/or orient themselves with respect to each other may be employed for the transmitter platform 180 and/or the target platform 190 of the disclosed system. The disclosed system provides a way for the moving systems to be able to automatically and quickly determine their relative distances and relative orientations.

In FIG. 1, the transmitter platform 180 is shown to comprise six transmitters 110, 120, 130, 140, 150, 160. And, the target platform 190 is shown to comprise one detector 170. The relative distance between each of the six transmitters 110, 120, 130, 140, 150, 160 on the transmitter platform 180 is known.

It should be noted that in other embodiments, the transmitter platform 180 may comprises more or less than six transmitters 110, 120, 130, 140, 150, 160, as is shown in FIG. 1. Additionally, it should be noted that in other embodiments, the target platform 190 may comprise more than one detector 170, as is shown in FIG. 1.

It should be noted that in some embodiments, the transmitter platform 180 comprises at least two transmitters and the target platform 190 comprises at least one detector; and the distance between the transmitters on the transmitter platform 180 is known. In other embodiments, the target platform 190 comprises at least two detectors and the transmitter platform 180 comprises at least one transmitter; and the distance between the detectors on the target platform 190 is known.

During operation of the system, each of the transmitters 110, 120, 130, 140, 150, 160 transmits a signal to the detector 170. Each of the signals transmitted from different transmitters 110, 120, 130, 140, 150, 160 is modulated at a different oscillation frequency (e.g., $\omega_1$, $\omega_2$, $\omega_3$, $\omega_4$, $\omega_5$, $\omega_6$). In some embodiments, each of the signals transmitted from different transmitters 110, 120, 130, 140, 150, 160 is transmitted on a different frequency (i.e. carrier frequency) (e.g., frequency band) (e.g., $f_1$, $f_2$, $f_3$, $f_4$, $f_5$, $f_6$). In one or more embodiments, the signals are (EM) electromagnetic signals. Various different types of EM signals may be employed by the disclosed system, including, but not limited to, radio frequency (RF) signals, X-ray signals, visible light signals, ultraviolet light signals, infrared signals, terahertz signals, or optical signals (e.g., pulsed laser signals or continuous wave (CW) laser signals).

The detector 170 then receives the signals. When the detector 170 receives the signals, each of the signals from the different transmitters 110, 120, 130, 140, 150, 160 focuses at a different location on the detector 170. At least one processor (not shown) determines the angle that each of the signals is being transmitted to the detector 170 from the different transmitters 110, 120, 130, 140, 150, 160 by using the respective location that each of the signals focused on the detector 170.

Specifically, the determination of the angle that each of the signals is being transmitted to the detector 170 from the different transmitters 110, 120, 130, 140, 150, 160 is achieved: (a) by the detector 170 generating at least one location signal indicating each location that the signals from the different transmitters 110, 120, 130, 140, 150, 160 are being focused on the detector 170, (b) by at least one fourier transform converter (not shown) transforming at least one location signal to generate at least one transformed signal, and (c) by at least one processor using at least one transformed signal to determine the angle that each of the signals is being transmitted to the detector 170 from the different transmitters 110, 120, 130, 140, 150, 160.

When there are more than one transmitter 110, 120, 130, 140, 150, 160 on a single transmitter platform 180, as is shown in FIG. 1, at least one processor determines the location (e.g., the six degrees of freedom x, y, z, pitch ($\alpha$), yaw ($\beta$), roll ($\gamma$)) of the transmitter platform 180 with respect to the target platform 190 by using the angle of each of the signals.

The processor then determines (by simple geometry) a relative position of the transmitter platform 180 with respect to the target platform 190 by using the angle that each of the signals is being transmitted to the detector 170 from the different transmitters 110, 120, 130, 140, 150, 160, and by using the known relative distance between each of the six transmitters 110, 120, 130, 140, 150, 160 on the transmitter platform 180.

Figure 2:
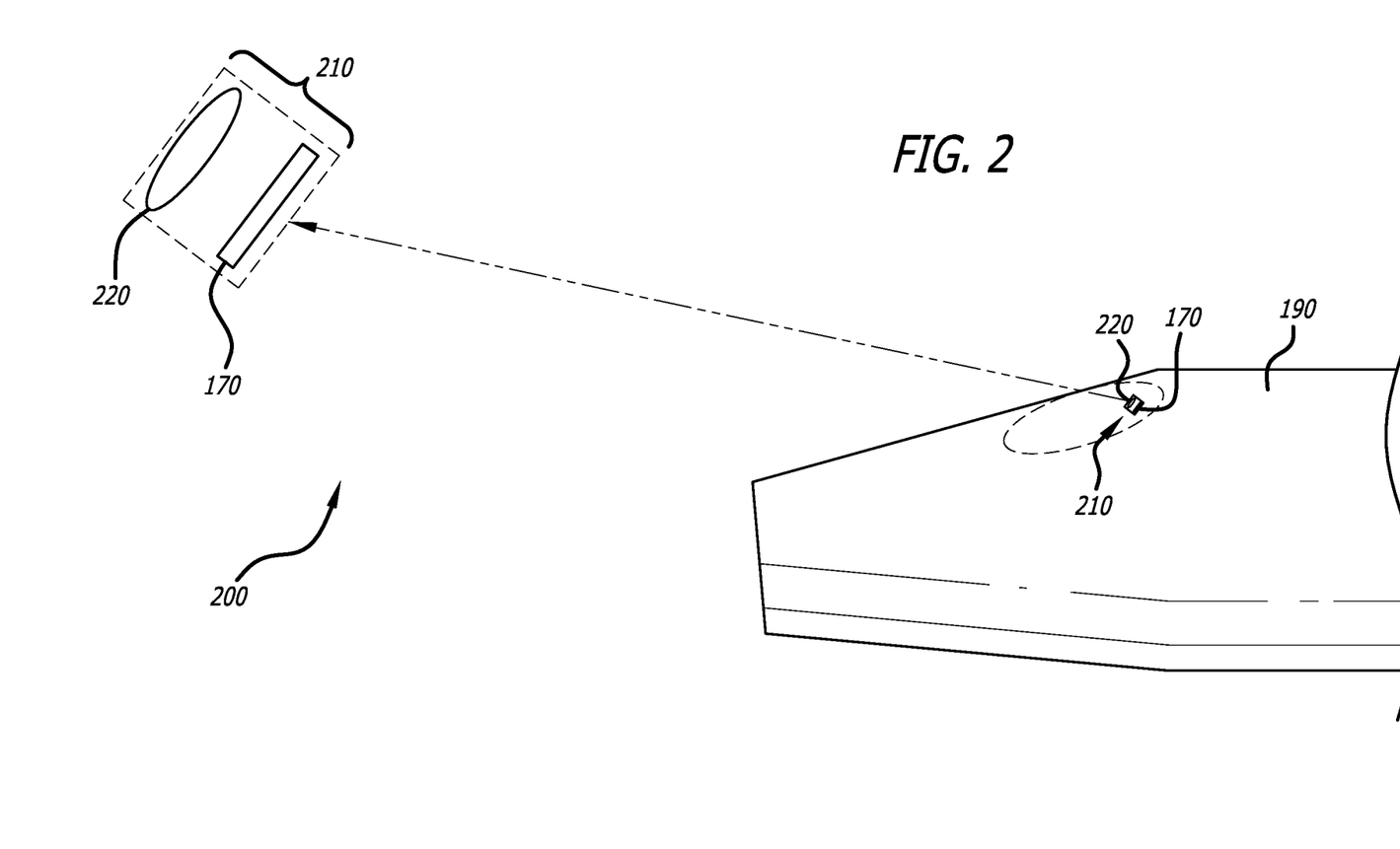
FIG. 2 is a diagram showing the details of the detector assembly employed by the disclosed high speed, three-dimensional (3D) locating system of FIG. 1, in accordance with at least one embodiment of the present disclosure.

FIG. 2 is a diagram 200 showing the details of the detector assembly 210 employed by the disclosed high speed, three-dimensional (3D) locating system of FIG. 1, in accordance with at least one embodiment of the present disclosure. In this figure, the detector assembly 210 is shown to be mounted to the target platform 190. In addition, the detector assembly 210 is shown to comprise a lens 220 and a detector 170. In one or more embodiments, a two-dimensional, position sensitive detector (2D-PSD) is employed by the disclosed system for the detector 170. For embodiments where the signals received by the detector 170 are optical signals, the detector assembly 210 may be approximately 1 cubic inch in size or smaller.

Figure 3:
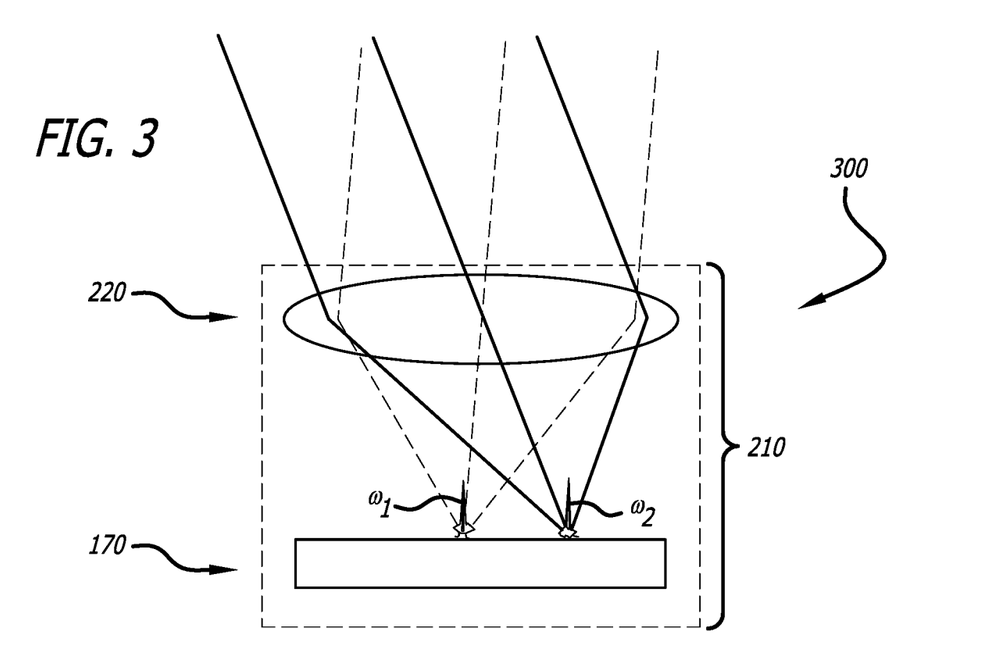
FIG. 3 is a diagram showing a cross-sectional view of the detector assembly employed by the disclosed high speed, three-dimensional (3D) locating system of FIG. 1 where signals are shown to be focused at different locations on the detector, in accordance with at least one embodiment of the present disclosure.

FIG. 3 is a diagram 300 showing a cross-sectional view of the detector assembly 210 employed by the disclosed high speed, three-dimensional (3D) locating system of FIG. 1 where signals are shown to be focused at different locations on the detector 170, in accordance with at least one embodiment of the present disclosure. In this figure, signals from two different transmitters (e.g., transmitter 110, which transmits a signal with a modulation frequency of $\omega_1$, and transmitter 120, which transmits a signal with a modulation frequency of $\omega_2$ in FIG. 1) are shown. The signals are shown in this figure to pass through the lens 220 of the detector assembly 210. Also, each of the signals are shown to focus at a different location on the detector 170 of the detector assembly 210.

Figure 4:
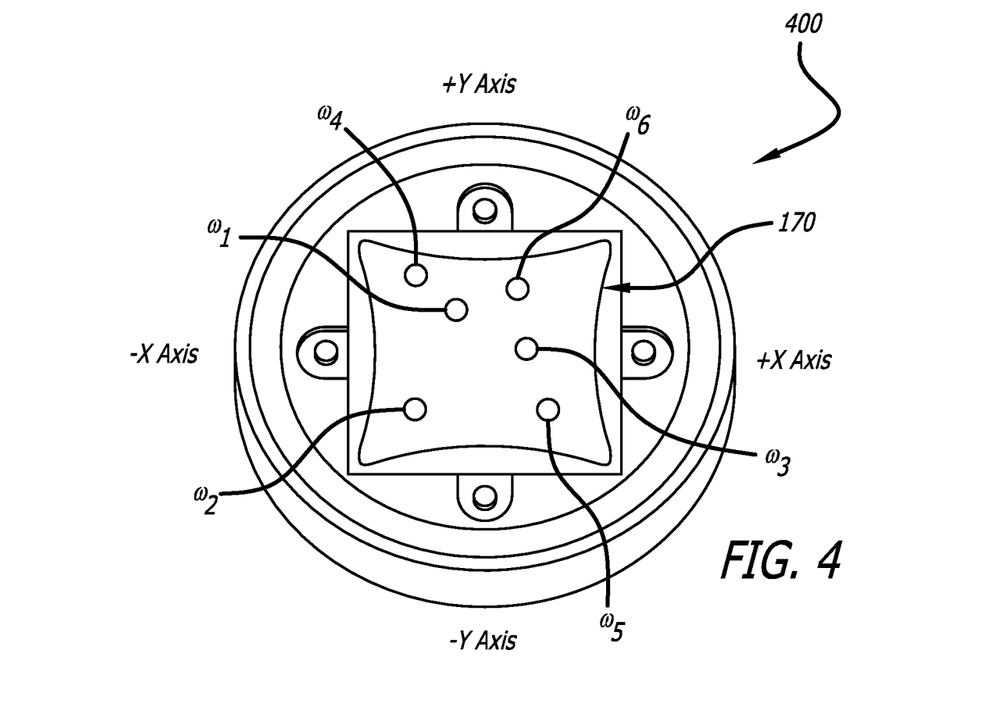
FIG. 4 is a diagram showing the details of the detector of the detector assembly employed by the disclosed high speed, three-dimensional (3D) locating system of FIG. 1, in accordance with at least one embodiment of the present disclosure.

FIG. 4 is a diagram 400 showing the details of the detector 170 of the detector assembly 210 employed by the disclosed high speed, three-dimensional (3D) locating system of FIG. 1, in accordance with at least one embodiment of the present disclosure. In this figure, a 2D-PSD detector is shown to be employed for the detector 170. In other embodiments, other similar types of detectors other than a 2D-PSD detector may be employed for the detector 170. The detector 170 is shown to exhibit six focus spots, where each of the six focus spots is located at a different location on the detector 170. Each focus spot corresponds to a signal transmitted from each of the different transmitters 110, 120, 130, 140, 150, 160 (refer to FIG. 1). As previously mentioned above, each of the signals transmitted from the different transmitters 110, 120, 130, 140, 150, 160 are modulated at a different oscillation frequency (e.g., $\omega_1, \omega_2, \omega_3, \omega_4, \omega_5, \omega_6$). Each of the signals focuses at a different location on the detector 170.

Figure 5:
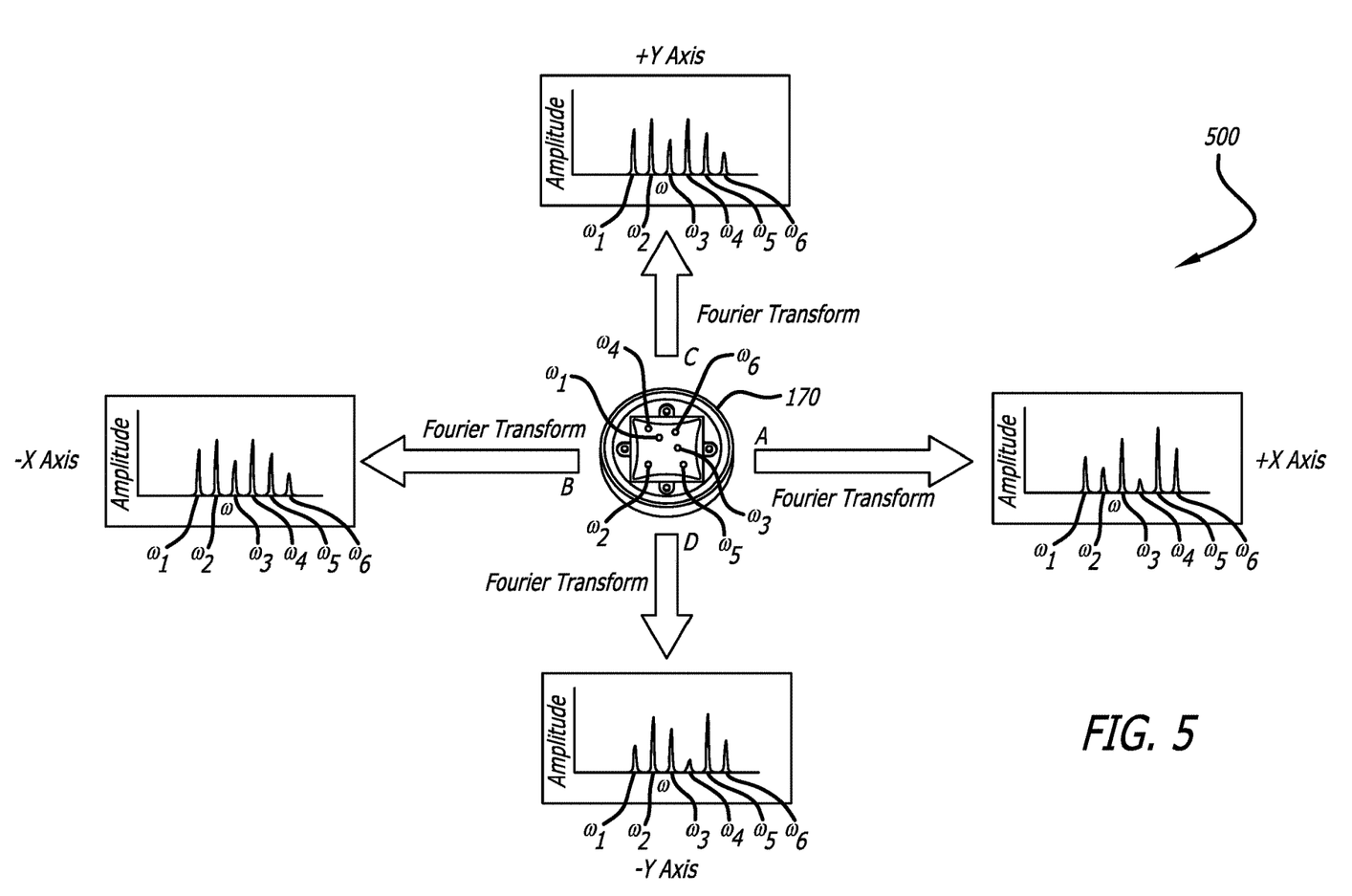
FIG. 5 is a diagram depicting the signal processing performed by the disclosed high speed, three-dimensional (3D) locating system of FIG. 1, in accordance with at least one embodiment of the present disclosure.

FIG. 5 is a diagram 500 depicting the signal processing performed by the disclosed high speed, three-dimensional (3D) locating system of FIG. 1, in accordance with at least one embodiment of the present disclosure. In this figure, a 2D-PSD detector is shown to be employed for the detector 170. A 2D-PSD detector generates four electrical signals (A, B, C, D) in response to a single focused spot on the detector 170. The four electrical signals (e.g., location signals) together represent the location that the spot is focused on the detector 170. Electrical signal A (e.g., location signal A) corresponds to the +X direction, electrical signal B (e.g., location signal B) corresponds to the −X direction, electrical signal C (e.g., location signal C) corresponds to the +Y direction, and electrical signal D (e.g., location signal D) corresponds to the −Y direction. The four electrical signals (e.g., location signals) for each focused spot are then each transformed by a fourier transform (FT) process (e.g., a fourier transform converter chip) to generate transformed signals (e.g., transformed location signals) (refer to FIG. 5, which shows the transformed signals plotted on graphs having an x-axis indicating frequency modulation ($\omega$) and a y-axis indicating amplitude). The transformed signals are used by a processor to determine the angle that each signal, which corresponds to a focused spot, was transmitted to the detector 170 from a transmitter 110, 120, 130, 140, 150, 160.

Figure 6:
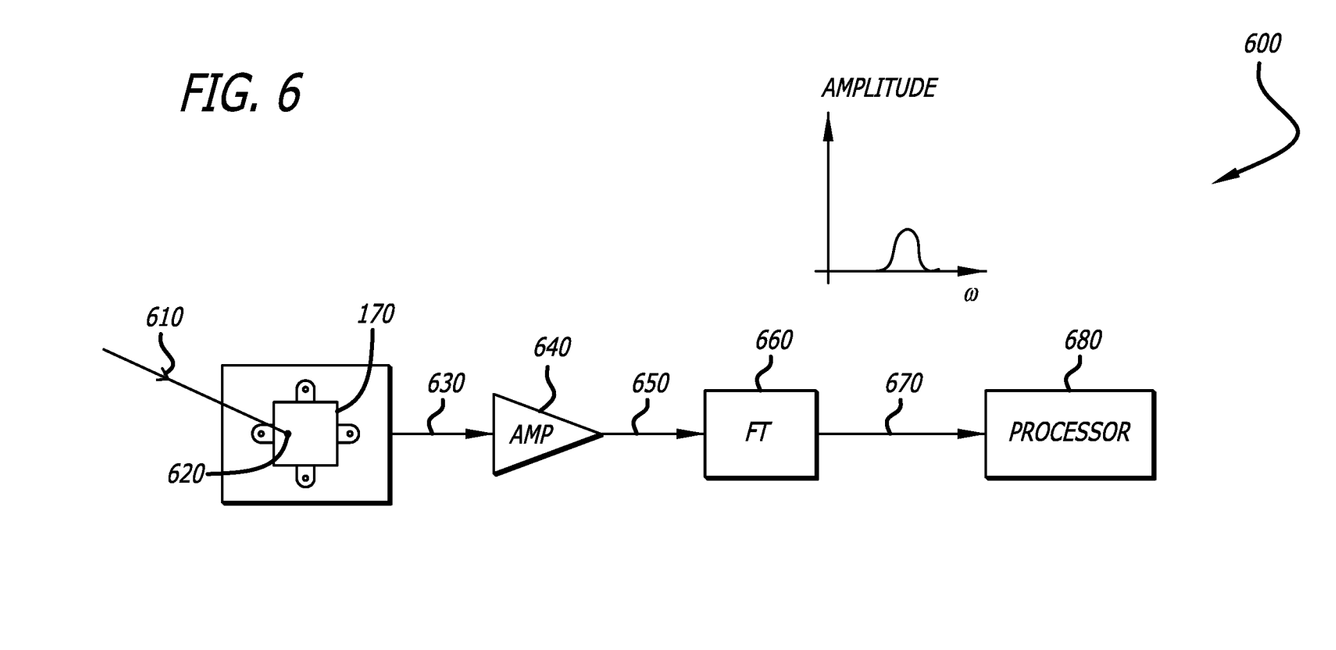
FIG. 6 is a block diagram showing exemplary units employed by the disclosed high speed, three-dimensional (3D) locating system of FIG. 1 for performing the signal processing, in accordance with at least one embodiment of the present disclosure.

FIG. 6 is a block diagram 600 showing exemplary units employed by the disclosed high speed, three-dimensional (3D) locating system of FIG. 1 for performing the signal processing, in accordance with at least one embodiment of the present disclosure. In this figure, a signal 610 from a transmitter (not shown) is being focused at spot 620 at a location on a detector 170. The detector generates four electrical signals (e.g., location signals) 630 that together represent the location that the spot 620 is focused on the detector 170. The electrical signals 630 are inputted into an amplifier 640. The amplifier amplifies the electrical signals 630 to generate amplified electrical signals 650. The amplified electrical signals 650 are inputted into a fourier transform converter (e.g., a digital signal processor (DSP) with a fourier transform algorithm) 660. The fourier transform converter 660 transforms the amplified electrical signals 650 to produce transformed signals (e.g., transformed location signals) 670. The transformed signals 670 are inputted into a processor(s) 680. The processor(s) 680 uses the transformed signals 670 (which indicate the specific distance from the center of the detector 170 of each centroid of the individual signals) along with the known focal length of the lens 220 to determine the angle that the signal 610 was transmitted to the detector 170 from the transmitter. It should be noted that one or more processors may be employed 680 by the disclosed system. When more than one processor 680 are employed, the processors 680 may perform parallel processing of the signals for efficiency.

It should be noted that, in one or more embodiments, analog and/or digital units may be employed by the disclosed system for the units to perform the signal processing.

Figure 7:
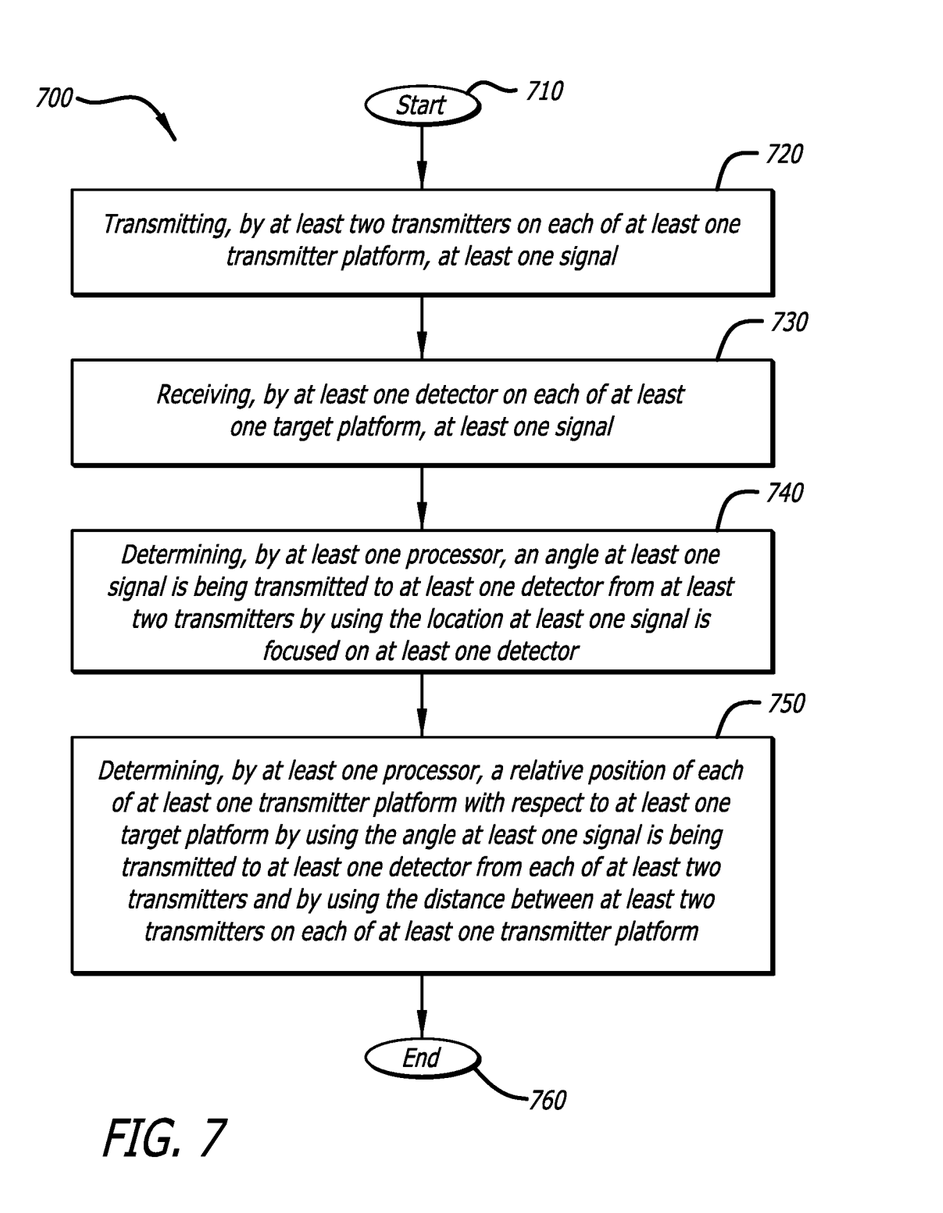
FIG. 7 is a diagram showing a flow chart for the disclosed method for a high speed, three-dimensional (3D) locating system employing at least two transmitters, in accordance with at least one embodiment of the present disclosure.

FIG. 7 is a diagram showing a flow chart for the disclosed method 700 for a high speed, three-dimensional (3D) locating system employing at least two transmitters, in accordance with at least one embodiment of the present disclosure. At the start 710 of the method 700, at least two transmitters on each of at least one transmitter platform transmit at least one signal 720. A distance between at least two transmitters on each of at least one transmitter platform is known. Also, each of at least one signal transmitted from a different one of at least two transmitters is modulated at a different oscillation frequency. At least one detector on each of at least on target platform receives at least one signal 730. When at least one detector receives at least one signal, at least one signal is focused at a location on at least one detector. Then, at least one processor determines an angle at least one signal is being transmitted to at least one detector from at least two transmitters by using the location at least one signal is focused on at least one detector 740. At least one processor then determines a relative position of each of at least one transmitter platform with respect to at least one target platform by using the angle at least one signal is being transmitted to at least one detector from each of at least two transmitters and by using the distance between at least two transmitters on each of at least one transmitter platform 750. Then, the method 700 ends 760.

Figure 8:
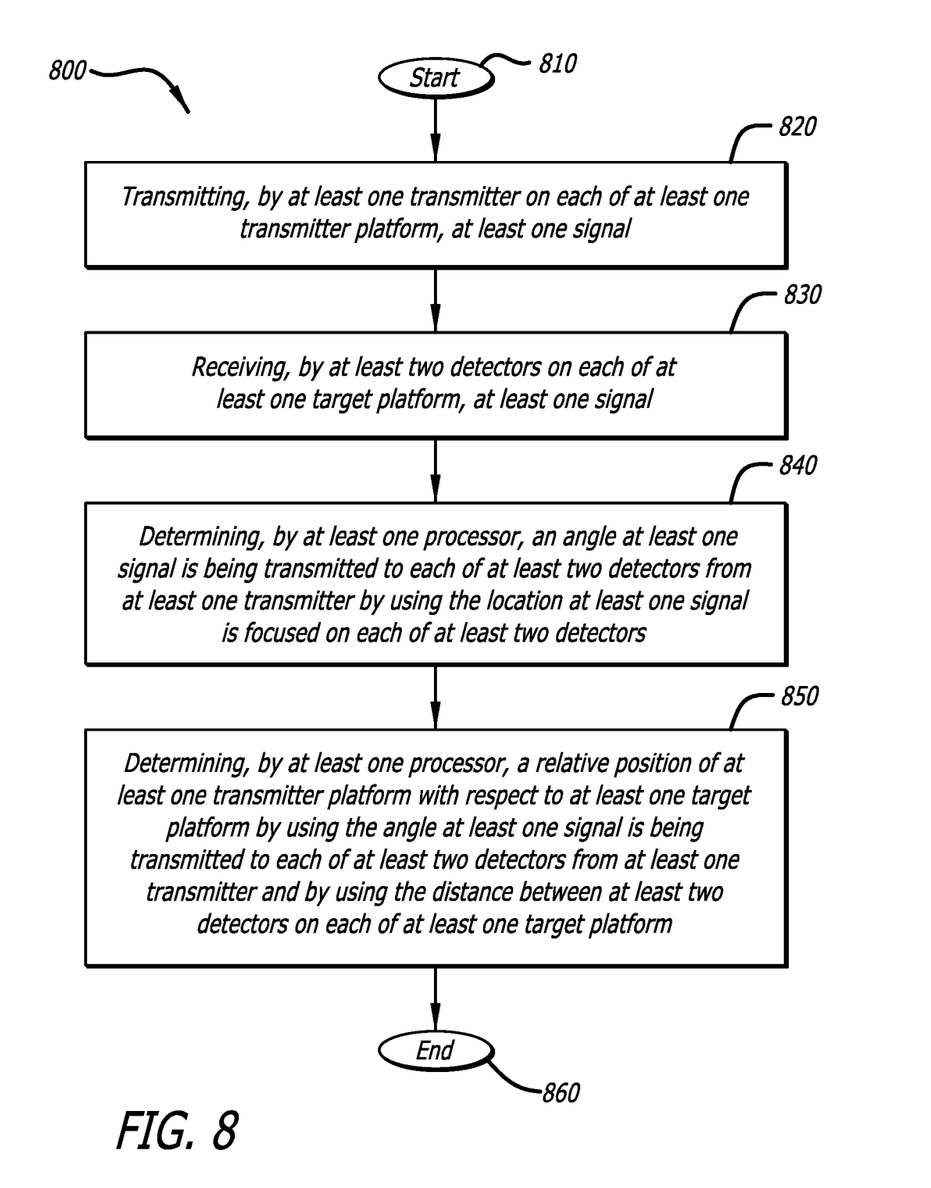
FIG. 8 is a diagram showing a flow chart for the disclosed method for a high speed, three-dimensional (3D) locating system employing at least two detectors, in accordance with at least one embodiment of the present disclosure.

FIG. 8 is a diagram showing a flow chart for the disclosed method 800 for a high speed, three-dimensional (3D) locating system employing at least two detectors, in accordance with at least one embodiment of the present disclosure. At the start 810 of the method 800, at least one transmitter on each of at least one transmitter platform transmits at least one signal 820. When there is more than one of at least one transmitter, each of at least one signal transmitted from a different one of the transmitters is modulated at a different oscillation frequency. At least two detectors on each of at least one target platform receive at least one signal 830. A distance between at least two detectors on each of at least one target platform is known. When at least two detectors receives at least one signal, at least one signal is focused at a location on each of at least two detectors. Then, at least one processor determines an angle at least one signal is being transmitted to each of at least two detectors from at least one transmitter by using the location at least one signal is focused on each of at least two detectors 840. At least one processor then determines a relative position of at least one transmitter platform with respect to at least one target platform by using the angle at least one signal is being transmitted to each of at least two detectors from at least one transmitter and by using the distance between at least two detectors on each of at least one target platform. Then, the method 800 ends 860.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for a locating system, the method comprising:
    transmitting, by each of at least two transmitters on each of at least one transmitter platform, at least one signal,
        wherein a distance between the at least two transmitters on each of the at least one transmitter platform is known,
        wherein each of the at least one signal transmitted from a different one of the at least two transmitters is modulated at a different oscillation frequency;
    receiving, by at least one detector on each of at least one target platform, the at least one signal,
        wherein when the at least one detector receives the at least one signal, the at least one signal is focused at a location on the at least one detector; and
    determining, by at least one processor, an angle the at least one signal is being transmitted to the at least one detector from each of the at least two transmitters by using the location the at least one signal is focused on the at least one detector; and
    determining, by the at least one processor, a relative position of each of the at least one transmitter platform with respect to the at least one target platform by using the angle the at least one signal is being transmitted to the at least one detector from each of the at least two transmitters and by using the distance between the at least two transmitters on each of the at least one transmitter platform.

2. The method of claim 1, wherein the at least one transmitter platform is a vehicle.

3. The method of claim 2, wherein the vehicle is one of a space vehicle, an airborne vehicle, a marine vehicle, or a terrestrial vehicle.

4. The method of claim 1, wherein the at least one target platform is a vehicle.

5. The method of claim 4, wherein the vehicle is one of a space vehicle, an airborne vehicle, a marine vehicle, or a terrestrial vehicle.

6. The method of claim 1, wherein the at least one detector is a two-dimensional position sensitive detector (2D-PSD).

7. The method of claim 1, wherein the at least one signal is an electromagnetic (EM) signal.

8. The method of claim 7, wherein the EM signal is one of a radio frequency (RF) signal, an X-ray signal, a visible light signal, an ultraviolet light signal, an infrared signal, a terahertz signal, or an optical signal.

9. The method of claim 1, wherein the determining, by the at least one processor, of the angle that the at least one signal is being transmitted to the at least one detector from the at least two transmitters is achieved: (a) by the at least one detector generating at least one location signal indicating the location that the at least one signal is focused on the at least one detector, (b) by transforming, by at least one fourier transform converter, the at least one location signal, to generate at least one transformed signal, and (c) by the at least one processor using the at least one transformed signal to determine the angle that the at least one signal is being transmitted to the at least one detector from the at least two transmitters.

10. A locating system, the system comprising:
    each of at least two transmitters on each of at least one transmitter platform to transmit at least one signal,
        wherein a distance between the at least two transmitters on each of the at least one transmitter platform is known,
        wherein each of the at least one signal transmitted from a different one of the at least two transmitters is modulated at a different oscillation frequency;
    at least one detector on each of at least one target platform to receive the at least one signal,
        wherein when the at least one detector receives the at least one signal, the at least one signal is focused at a location on the at least one detector; and
    at least one processor configured to determine an angle the at least one signal is being transmitted to the at least one detector from each of the at least two transmitters by using the location the at least one signal is focused on the at least one detector, and to determine a relative position of each of the at least one transmitter platform with respect to the at least one target platform by using the angle the at least one signal is being transmitted to the at least one detector from each of the at least two transmitters and by using the distance between the at least two transmitters on each of the at least one transmitter platform.

11. The system of claim 10, wherein the at least one detector is a two-dimensional position sensitive detector (2D-PSD).

12. The system of claim 10, wherein the at least one signal is an electromagnetic (EM) signal.

13. The system of claim 12, wherein the EM signal is one of a radio frequency (RF) signal, an X-ray signal, a visible light signal, an ultraviolet light signal, an infrared signal, a terahertz signal, or an optical signal.

14. The system of claim 10, wherein the at least one processor determines the angle that the at least one signal is being transmitted to the at least one detector from the at least two transmitters: (a) by the at least one detector generating at least one location signal indicating the location that the at least one signal is focused on the at least one detector, (b) by at least one fourier transform converter transforming the at least one location signal to generate at least one transformed signal, and (c) by the at least one processor using the at least one transformed signal to determine the angle that the at least one signal is being transmitted to the at least one detector from the at least two transmitters.

15. A method for a locating system, the method comprising:
transmitting, by at least one transmitter on each of at least one transmitter platform, at least one signal,
wherein when there is more than one of the at least one transmitter, each of the at least one signal transmitted from a different one of the transmitters is modulated at a different oscillation frequency;
receiving, by each detector of at least two detectors on each of at least one target platform, the at least one signal,
wherein a distance between the at least two detectors on each of the at least one target platform is known,
wherein when each detector of the at least two detectors receives the at least one signal, the at least one signal is focused at a location on each detector of the at least two detectors; and
determining, by at least one processor, a respective angle the at least one signal is being transmitted to each detector of the at least two detectors from the at least one transmitter by using the location the at least one signal is focused on each detector of the at least two detectors; and
determining, by the at least one processor, a relative position of the at least one transmitter platform with respect to the at least one target platform by using the respective angle the at least one signal is being transmitted to each detector of the at least two detectors from the at least one transmitter and by using the distance between the at least two detectors on each of the at least one target platform.

16. The method of claim 15, wherein the determining, by the at least one processor, of the respective angle that the at least one signal is being transmitted to each detector of the at least two detectors from the at least one transmitter is achieved: (a) by each detector of the at least two detectors generating at least one location signal indicating the location that the at least one signal is focused on each detector of the at least two detectors, (b) by transforming, by at least one fourier transform converter, the at least one location signal, to generate at least one transformed signal, and (c) by the at least one processor using the at least one transformed signal to determine the respective angle that the at least one signal is being transmitted to each detector of the at least two detectors from the at least one transmitter.

17. The method of claim 15, wherein the at least one transmitter platform is a vehicle.

18. A locating system, the system comprising:
at least one transmitter on each of at least one transmitter platform to transmit at least one signal,
wherein when there is more than one of the at least one transmitter, each of the at least one signal transmitted from a different one of the transmitters is modulated at a different oscillation frequency;
at least two detectors on each of at least one target platform to receive the at least one signal,
wherein a distance between the at least two detectors on each of the at least one target platform is known,
wherein when each detector of the at least two detectors receives the at least one signal, the at least one signal is focused at a location on each detector of the at least two detectors; and
at least one processor configured to determine a respective angle the at least one signal is being transmitted to each detector of the at least two detectors from the at least one transmitter by using the location the at least one signal is focused on each detector of the at least two detectors, and to determine a relative position of the at least one transmitter platform with respect to the at least one target platform by using the respective angle the at least one signal is being transmitted to each detector of the at least two detectors from the at least one transmitter and by using the distance between the at least two detectors on each of the at least one target platform.

19. The system of claim 18, wherein the at least one processor determines the respective angle that the at least one signal is being transmitted to each detector of the at least two detectors from the at least one transmitter: (a) by each detector of the at least two detectors generating at least one location signal indicating the location that the at least one signal is focused on each detector of the at least two detectors, (b) by at least one fourier transform converter transforming the at least one location signal to generate at least one transformed signal, and (c) by the at least one processor using the at least one transformed signal to determine the respective angle that the at least one signal is being transmitted to each detector of the at least two detectors from the at least one transmitter.

20. The locating system of claim 18, wherein the at least one target platform is a vehicle.

* * * * *